Aug. 15, 1933.  F. W. OLIN ET AL  1,922,320
METHOD AND APPARATUS FOR DETERMINING THE INTERIOR
BALLISTIC CHARACTERISTICS OF FIXED AMMUNITION
Filed Feb. 2, 1928    2 Sheets-Sheet 1
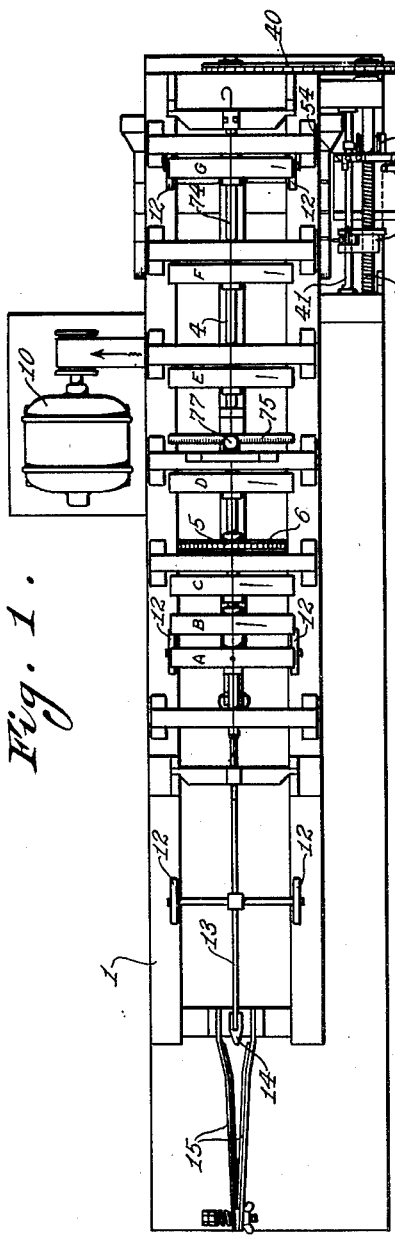
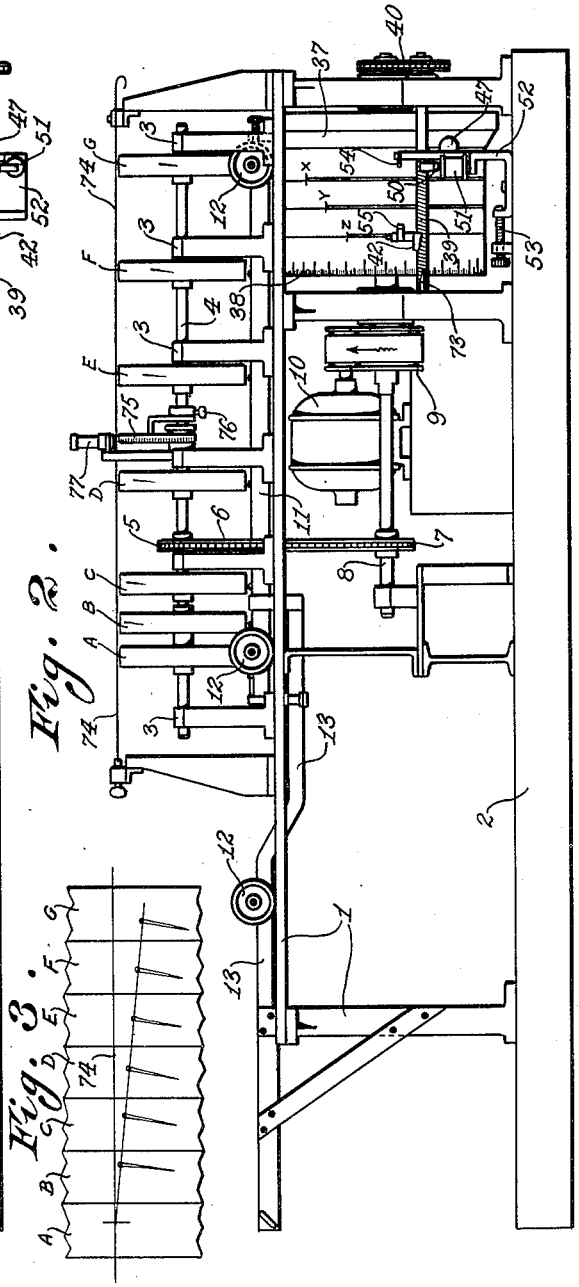
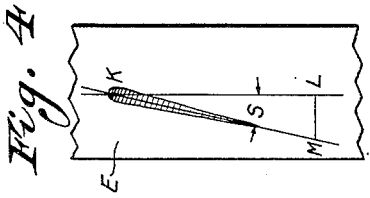
Inventors:
FRANKLIN W. OLIN, JOHN M. OLIN AND ROBERT G. CLYNE,
By John N Bruninga
Their Attorney.

Aug. 15, 1933.    F. W. OLIN ET AL    1,922,320
METHOD AND APPARATUS FOR DETERMINING THE INTERIOR
BALLISTIC CHARACTERISTICS OF FIXED AMMUNITION
Filed Feb. 2, 1928    2 Sheets-Sheet 2
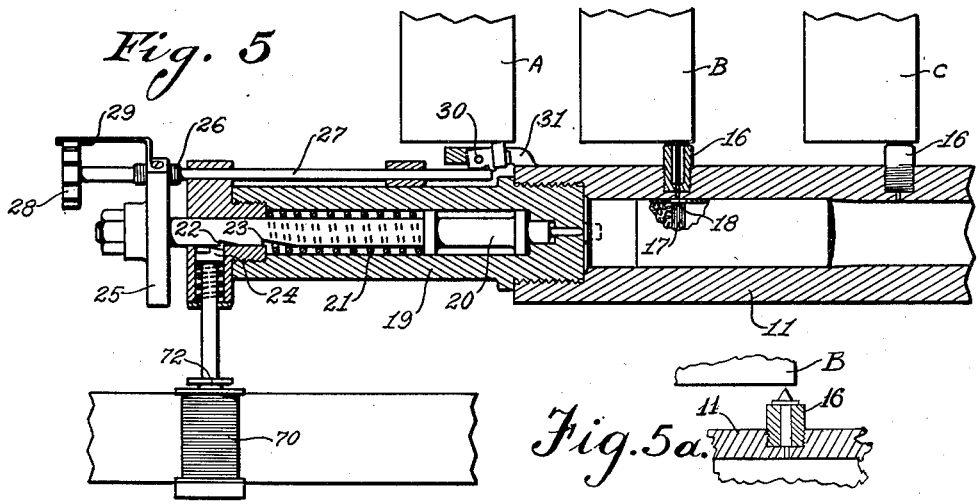
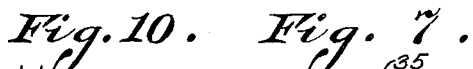
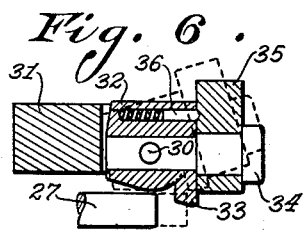
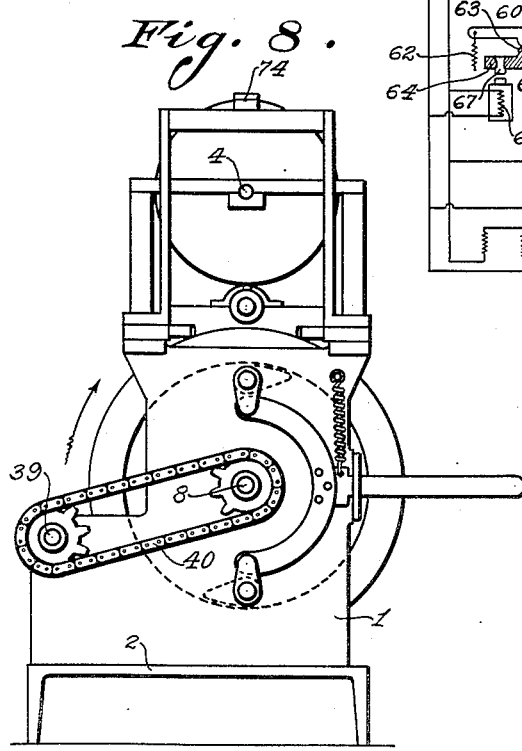

Patented Aug. 15, 1933

1,922,320

UNITED STATES PATENT OFFICE 1,922,320

METHOD AND APPARATUS FOR DETERMINING THE INTERIOR BALLISTIC CHARACTERISTICS OF FIXED AMMUNITION

Franklin W. Olin, John M. Olin, and Robert G. Clyne, Alton, Ill., assignors to Western Cartridge Company, East Alton, Ill., a Corporation of Delaware Application February 2, 1928. Serial No. 251,303

41 Claims. (Cl. 234—1)

This invention pertains to a method and apparatus for testing fixed ammunition in order to determine the interior ballistic characteristics thereof. More particularly it pertains to a method and apparatus for testing cartridges, so as to determine the velocity of the charge during its travel through the barrel, the recoil of the barrel, and like information.

One of the objects of this invention is to provide a method and apparatus which will indicate the time of movement of the charge through the barrel in a simple and convenient manner.

Another object is to provide such a method and apparatus in which standard ammunition may be tested and the characteristics of each particular cartridge determined.

Another object is to provide such a method and apparatus by which the variation in velocity of the charge as it travels along the barrel may be determined.

Another object is to provide a method and apparatus for measuring the recoil of the barrel upon firing a cartridge therein.

Another object is to provide a method and apparatus whereby the movement of the charge through the barrel is recorded on a moving record.

Another object is to provide a method and apparatus in which the gas generated by the firing of the propelling charge is caused to make a record of the movement of the projectile through the barrel.

Another object is to provide improved means for taking time measurements of the movement of the charge through the barrel.

Further objects will appear from the following description, taken in connection with the accompanying drawings, in which—

Figure 1 is a plan view of a machine embodying this invention;

Figure 2 is a side elevation of the same;

Figure 3 is a fragmentary view, showing the various drum sections in developed view and placed adjacent one another for comparison;

Figure 4 is a fragmentary developed view of part of a drum section illustrating one method of measuring recoil;

Figure 5 is a partial longitudinal section of the barrel, showing the positions of some of the drum sections relatively thereto;

Figure 5a is a detail of a modification of Fig. 5;

Figure 6 is a sectional detail of the device for recording the time of firing;

Figure 7 is a right-hand end view of Figure 6;

Figure 8 is a right-hand end view of Figure 2;

Figure 9 is a detail of the timing mechanism; and

Figure 10 is a diagram of the electric circuits.

In accordance with the present invention, a cartridge of fixed ammunition, such as a shotgun shell, is fired in a barrel which is equipped with means for indicating the arrival of the shot charge at certain points along the barrel. Said indicating means are arranged to record the arrival of the charge on a moving record. The record is arranged to indicate the time interval elapsing between successive indications produced by the arrival of the charge at successive indicating points along the barrel. Accurate timing mechanism is provided so that the lapse of time between intervals represented on the record may be accurately determined. In accordance with the method of this invention, as illustrated in the drawings, the barrel is taped at intervals therealong and the propelling gas issuing from the tap openings is caused to record the arrival of the charge on a record moving opposite the tap holes.

Referring to the accompanying drawings, 1 indicates a frame of any suitable construction, mounted on a rigid base 2. Mounted to rotate in suitable bearings 3 on the frame 1 is a shaft 4. Fixed to the shaft 4 at intervals therealong is a series of drum sections A, B, C, etc. The shaft 4 carries a sprocket 5 connected by a chain 6 with a sprocket 7 on a shaft 8 carrying a pulley 9, which is belted to a driving motor 10. The motor 10, therefore, through the agency of the shaft 8 and the chain 6, drives the shaft 4 so as to rotate the drum sections A, B, C, etc. The gear ratio between the sprockets 5 and 7 has been taken such that the shaft 4 rotates at twice the speed of the shaft 8. The purpose of this will be more fully explained hereinafter.

Mounted parallel to and directly below the shaft 4 is a barrel 11 chambered to receive the ammunition to be tested. This barrel is mounted on a series of trucks, having wheels 12 arranged to roll on the upper part of the frame 1. The barrel 11 also has secured thereto a stop element 13 extending rearwardly therefrom and having a head 14 adapted to engage a pair of spring-pressed brake shoes 15 when the barrel recoils, so as to take up the recoil and stop the movement of the barrel.

The barrel 11 is tapped at intervals therealong and provided at the tapped points with controlling elements, by means of which the pressure of the propelling gas may be utilized to make a record on the drums A, B, C, etc. In the embodiment shown in the drawings, one drum section is positioned immediately over each one of the tap elements 16 so as to receive the record made thereby. In Figure 5, the element 16 is illustrated simply as a bushing provided with an orifice through which the gas may escape from the barrel. Other means may, of course, be used. For instance, a plunger might be mounted in the element 16 to be operated by the gas pressure to mark the record as indicated in Figure 5a. Electric contact elements of suitable design may also be used. In the device illustrated, an arrangement for testing shotgun shells is shown. In this case the first element 16 is located at a point opposite the wad 17 of the cartridge shell, which separates the powder from the shot charge. Prior to inserting the shell in the chamber, a small hole 18 is made in the shell tube opposite the wad 17, and this hole is placed in registry with said first element 16, so that the powder gases may escape through said hole.

After the shell has been placed in the chamber, the firing head 19 is screwed in place in the barrel. This head carries a firing pin 20 of any suitable design and actuated by a spring 21 to fire the cartridge. The pin 20 is provided with notches 22 and 23 adapted to engage a sear 24 for setting the pin at half and full cock, respectively. The pin 20 is further provided with an enlarged head 25 threaded to receive the threaded portion 26 of a pin 27 guided in the firing head 19, so as to move with the firing pin 20. The pin 27 has an adjusting head 28 provided with a stop 29, by means of which its position relatively to the pin 20 may be adjusted. Pivoted at 30 in a bracket 31 on the barrel 11 is a block 32 provided with a downward extension 33 positioned in the path of the pin 27. The block 32 carries a pin 34, upon which is pivoted a dog 35 having a sharpened upper edge. This dog may be held in upright position by a spring-pressed stop 36 engaging a suitable depression in the dog, as illustrated in Figure 6.

When the cartridge is fired, the pin 20 moves forward into engagement with the primer cap, and the pin 27 moves with it. By turning the head 28, the pin 27 may be so adjusted that its forward end engages the extension 33 at the same instant that the point of the pin 20 engages the primer cap. The firing movement of the pin 20 will, therefore, cause the pin 27 to strike the extension 33, thereby tipping the block 32 upwardly and bringing the pointed edge of the dog 35 sharply against the drum section A, so as to make a mark thereon. This dog strikes the drum while it is rotating, and the rotation causes the dog to pivot on the pin 34 and move to an inclined position, as shown in dotted lines in Figure 7. This prevents the dog from dragging along the drum.

One of the drum sections A, B, C, etc., is placed opposite each of the elements 16. When the cartridge is fired, the instant of firing will be recorded by the dog 35 on the drum section A. As soon as the powder has been ignited and a sufficient pressure generated to move the charge, the wad 17 will move forwardly, thereby exposing the opening 18 so that the gas will rush out through the element 16, forming a jet which impinges on the surface of the drum section B, making a characteristic mark thereon. As the shot charge travels through the barrel, its arrival at the successive elements 16 will be recorded by a jet of flame from that element against the adjacent drum section. The drums A, B, C, etc., are caused to rotate at a definite speed. The interval between the records made on the successive drum sections may, therefore, be determined, and, consequently, the velocity of movement of the charge from each element 16 to the next may be determined. Figure 3 shows the appearance of the marks made on the successive drum sections and their general relation to one another.

In order to determine accurately the time interval represented by the spacings of the marks shown in Figure 3, a timing drum 37 is mounted on the shaft 8, which rotates at half the speed of the drum sections A, B, C, etc. This drum may be provided with a circumferential scale 38 for determining the circumferential position of marks thereon. Mounted adjacent the drum 37 is a lead screw 39 driven by a chain 40 from the shaft 8 (see Figure 8). Mounted adjacent the screw 39 and parallel thereto, is a guide rod 41 upon which a carrier 42 is mounted to slide. The carrier 42 is provided with a half thread 43 adapted to engage the lead screw 39 so that the carrier may be moved by said screw (see Figure 9). Flexibly mounted on the carrier 42 is a stylus 45. Fixed to the end of the rod 41 is a lever 46, whose end stands opposite an electro-magnet 47, so that when the magnet is energized, the lever will act to rock the rod. Mounted to slide on the rod 41, between the arms of the carrier 42, is a block 44, which carries an upwardly extending arm 48, whose end stands adjacent the stylus 45. One side of the rod 41 is flattened, and the bore of the block 44 has a corresponding flattened portion adapted to operate as a spline, whereby the block 44 may be rocked by rocking the rod 41. It will be seen that when the magnet 47 is energized, the lever 46 will be attracted thereby and the rod 41 will be rocked so as to cause the arm 48 to move the stylus 45 into engagement with the drum 37. A bell crank pivoted at 48 has one arm 49 normally positioned under the tip of the carrier 42 so as to hold the same out of engagement with the lead screw 39. The other end 50 of said bell crank stands opposite an electro-magnet 51. When the magnet 51 is energized, the bell crank is rocked so as to drop the carrier 42 upon the lead screw 39, so as to start the movement of the same along the drum 37. The bracket 52, upon which the magnets 47 and 51 are mounted, is mounted for adjustment along the base 2, by means of an adjusting screw 53. The bracket 52 has mounted on the upper portion thereof a finger 54 (see Figure 2) adapted to engage a lateral extension 55 on the arm 48 when the carrier 42 stands at its initial or extreme right-hand position, Figure 2. The purpose of this will be more fully described hereinafter.

The electrical connections are shown in Figure 10. In this figure 56 designates a pendulum operated by a clockwork of any suitable type. The lower end of this pendulum is provided with a contacting tip 57 adapted to make a momentary contact with a similar tip 58 on the end of a lever 59 pivoted at 60 on a bracket 61 and tensioned by a spring 62. The lever 59 is positioned by a stop 63 on a lever 64 pivoted at 65 and tensioned by a spring 66. The lever 64 carries an iron plug 67 positioned to be attracted by a magnet 68 when the latter is energized. The lever 59 may be adjusted by means of a screw 69, so as to make practically an instantaneous contact with the tip 57. The tip 58 is, however, normally held out of contact with the tip 57 by engagement of the stop 63 with the lever 59. The magnets 47, 51, 68 and 70 are all connected to a circuit controlled by a snap switch 71. The magnet 70 is mounted on the frame 1 just below an armature 72 mounted on the sear 24. Closing the snap switch 71 sets the entire apparatus in operation.

The operation of the device is as follows: The cartridge having been placed in the chamber and the firing head 19 placed in position, the firing pin 20 is gently lowered into contact with the primer cap. With the parts in this position the pin 27 is adjustable so as to bring the dog 35 just into contact with the drum A. The pins 20 and 27 are then retracted until the sear 24 engages the notch 23. The drums A, B, C, etc., together with the drum 37, are set into rotation at a substantially uniform speed. The operator then closes the snap switch 71. The circuits controlled by the switch 71 simultaneously start a number of operations. The magnet 70 is energized so as to draw down the armature 72 and release the firing pin, so that the cartridge is fired. At the instant that the firing pin strikes the primer cap the dog 35 makes its record upon the drum A. As soon as sufficient gas pressure has been developed in the shell, the wad 17 is moved and the flame escapes from the first of the elements 16 and records its action upon the drum B. As the charge arrives successively at the other elements 16, a gas flame issues from each tap hole against the drums C, D, E, etc., in succession. These flame jets will mark the surfaces of the drum sections, as shown in Figure 3. The drums may be coated with any material adapted to take a record from the flame jets. Ordinary white wall paint has been found quite suitable. It is easily put on, dries quickly, takes a good impression and is easily removed.

At the same time that the cartridge is fired by operation of the magnet 70, the magnet 51 will cause the bell crank lever to drop the carrier 42 upon the lead screw, so as to start the movement of said carrier. As it may happen that the threads of the carrier are not exactly engaged with those of the lead screw, it is desirable to avoid making a record on the drum 37 until a true engagement of these threads can be accomplished. For this purpose the initial setting of the carrier 42 is made in such a way that the extension 55 stands behind the finger 54, so as to prevent actuation of the stylus. As the lead screw turns, its threads will presently be matched with those of the carrier, and the latter will be started in its movement across the drum. Such movement will disengage the extension 55 from the finger 54 and thereafter permit a record to be made with the stylus 45.

At the same instant that the magnets 70 and 51 operate, the magnet 68 will draw down the lever 64 so as to permit the lever 59 to rise against the stop screw 69, so as to be positioned for contact with the pendulum. Thereafter, every contact of the tips 57 and 58 will close the circuit through the magnet 47, as indicated by the diagram of Figure 10. These closings of the circuit will occur at exactly equal time intervals, as determined by the pendulum 56. Each time the circuit is closed, the stylus 45 is brought into engagement with the drum 37 to make a mark thereon. The spacing of these marks on the drum then indicates the travel of the drum during a determined time interval and, therefore, furnishes a measure of the speed of the drum. Since the speed ratio of the sprockets 5 and 7 is such that the shaft 4 rotates at twice the speed of the shaft 8, a determination of the speed of the record drums is thereby obtained. With the speed of the drums determined, the time intervals represented by the displacements of the marks on the drums B, C, D, etc., from the initial mark on the drum A can be computed. In this way the time of travel of the charge through the barrel can be determined for a considerable number of points along the barrel.

The speed of rotation of the record drums is determined as follows: As previously stated, each contact of the stylus 45 with the drum 37 will result in a mark on the drum. The initial point of this mark represents the instant when the stylus first came in contact with the drum. The marks on the drum take the appearance illustrated in Figure 2, in which the initial points of the successive marks are indicated at X, Y and Z. The axial distance between successive marks, as for instance X and Y, divided by the pitch of the lead screw 39 gives the number of complete revolutions which the drum 37 has made in the interval between the contacts at the points 57 and 58. The pendulum is usually adjusted to make this interval one second. The circumferential distance between successive marks, which may be measured on the scale 38, indicates the fraction of a revolution which must be added to the number of complete revolutions determined as above, in order to obtain the complete travel of the drum in one second. When these values have been determined, the exact speed of rotation of the drum can be computed. A convenient manner of carrying out this determination is to permit the stylus to travel across the drum until at least three contacts have been made, so that a total interval of two seconds may be measured. The device illustrated is so arranged. It is also supplied with a beveled finger 73, which is engaged by the carrier 42 at the end of its travel. The beveled face of this finger lifts the carrier out of engagement with the lead screw 39, so that its travel is stopped. Having marks on the drum 37, covering an interval of two seconds, the number of revolutions of that drum occurring in two seconds may be determined. The same figure will then represent the number of revolutions made in one second by the drums A, B, C, etc., since the speed ratio is two to one.

In order to measure the displacement of the record marks on the drums, an index wire 74 is stretched taut over the tops of all the drums and parallel to the shaft 4. This serves as an index to locate the zero position on all the drums alike. This zero position is set by the position of the initial mark on drum A and can thus be carried over to the successive drums. A graduated sector 75 is loose on the shaft 4, but is arranged to be clamped thereto by means of a clamping screw 76.

In order to determine the displacement of any of the record marks, the shaft 4 is turned until the initial mark on the drum A comes exactly under the wire 74. The sector 75 is then turned until its zero mark coincides with said wire and is then clamped to the shaft 4. The deflection of any subsequent record mark may then be determined by simply turning the shaft 4 until that record mark comes under the wire 74 and then reading the deflection as indicated on the sector 75. A microscope 77 may be provided for accurately reading the scale 75.

Two methods of determining the recoil of the barrel are available. In one of these the drum sections A, B, C, etc., are all set in uniform relation with their respective elements 16. By this is meant that the distance of each element 16 from the forward edge of its respective drum section is the same for all the drums when the device is set and ready for firing. When this is done, it will be noted that the record marks on the drums A and B have their initial points the same distance from the edges of their respective drums. This is for the reason that the barrel does not move between the time that the firing pin falls and the time when the charge begins to move. The marks on successive drums, after the drum B, however, will be found at successively increasing distances from the forward edges of their drums. The increase increments of these distances each represent the spaces through which the barrel has moved in the interval of time during which the charge has moved from the position of the drum B to the position of the drum whose mark is under investigation. These distances may be measured, and since the interval of time required for such movement may be determined as outlined above, the velocity of the recoil may be computed for any point along the barrel.

Another method of determining the velocity of recoil is illustrated in Figure 4. As shown in this figure, the mark made by the flame jet on the drum is not in a plane perpendicular of the axis, but is inclined at an angle thereto. This angle S, as indicated in the figure, is a measure of the velocity of recoil of the barrel at the instant that the charge arrived at the point where the record was made. If a line KM be drawn through the center of the mark, as indicated in the figure, and another line KL drawn in a plane at right angles to the axis of the drum, and then a line LM drawn perpendicular to KL at any convenient point, the length of the line LM will represent the actual movement of the barrel during the time interval represented by the length of the line KL. This time interval may be determined as pointed out above.

It will be seen, therefore, that this invention accomplishes its objects. A method of testing is provided, by which readings of the velocity of movement of the charge may be made at a succession of points along the barrel during the firing of a single cartridge. Accordingly, the ballistic characteristics of each individual cartridge can be determined. The time required to ignite the powder charge and bring the pressure up to the starting value may also be obtained. By these means the manufacturer may obtain accurate information as to the performance not only of various grades of powder, but of various combinations of powder charge and projectile. In the embodiment illustrated, the record is made by the projectile propelling gas itself issuing from the tap holes. Accordingly, as there are no mechanical elements involved in transmitting this record to the drum, the time lag between the actual occurrence of the phenomenon and the making of the record is reduced to a minimum. The record is made in such a way that very accurate determinations of time intervals may be made. The mechanism is so arranged that the shell is fired and the entire record is taken by simply closing the snap switch 71.

In addition to records involving the action of the charge itself, the recoil of the barrel can be accurately determined. This determination may be made not only for the total recoil involved in the complete travel of the charge through the length of the barrel, but the distance through which the barrel moves during each interval of time may be determined. Furthermore, by the method described for Figure 4, the actual velocity of movement of the barrel as the charge passes each recording element may be determined. The arrangements for measuring time are arranged so that by simply taking the record on the drum 37 through two seconds, the movement of the recording drums in one second may be determined. This arrangement makes for increased accuracy, since the drum 37 moves more slowly than the recording drums, and an error in measurement or recording made on that drum will be divided in half when applied to the final speed determination.

While the apparatus has been described as a complete co-operating device, operating as a unit, it is understood, of course, that sub-combinations may be useful by themselves, and such use is contemplated by this invention. It is further obvious that various changes may be made in details of construction, within the scope of the appended claims, without departing from the spirit of this invention. It is, therefore, to be understood that this invention is not to be limited to the specific construction shown and described.

Having thus described the invention, what is claimed is:

1. A method of determining the interior ballistic characteristics of fixed ammunition, comprising, igniting the charge in a barrel and causing the charge to indicate its arrival successively at a number of points along the barrel.

2. A method of determining the interior ballistic characteristics of fixed ammunition, comprising, tapping a barrel, in which the charge is to be fired, at a number of points therealong, and successively indicating the arrival of the charge at those points.

3. A method of determining the interior ballistic characteristics of fixed ammunition, comprising, tapping a barrel, in which the charge is to be fired, at a number of points therealong, and successively indicating the development of the pressure at those points after the charge has been fired.

4. A method of determining the interior ballistic characteristics of fixed ammunition, comprising, igniting the charge in a barrel and successively measuring the time intervals during which the charge moves along successive portions of the barrel.

5. A method of determining the interior ballistic characteristics of fixed ammunition, comprising, tapping a barrel, in which the charge is to be fired, at a number of points therealong, and successively measuring the time intervals during which the pressure is developed at those points after the charge has been fired.

6. A method of determining the interior ballistic characteristics of fixed ammunition having a non-magnetic projectile, comprising, igniting the charge in a barrel and recording the firing of the charge and the development of the pressure at a point along the barrel on a moving record.

7. A method of determining the interior ballistic characteristics of fixed ammunition having a non-magnetic projectile, comprising, igniting the charge in a barrel and recording the start of movement of the charge and its arrival at a point along the barrel on a moving record.

8. A method of determining the interior ballistic characteristics of fixed ammunition having a non-magnetic projectile, comprising, igniting the charge in a barrel and recording the start of movement of the charge and its arrival at a number of points spaced along the barrel on a moving record.

9. A method of determining the interior ballistic characteristics of fixed ammunition, comprising, tapping a barrel in which the charge is to be fired, and recording the development of the pressure on a moving record opposite the tap.

10. A method of determining the interior ballistic characteristics of fixed ammunition, comprising, tapping a barrel in which the charge is to be fired, and causing the developed gas to issue from the tap and against a moving record.

11. A method of determining the interior ballistic characteristics of fixed ammunition, comprising, tapping a barrel in which the charge is to be fired, at a number of points therealong, and recording the development of the pressure on a moving record opposite the taps.

12. A method of determining the interior ballistic characteristics of fixed ammunition, comprising, tapping a barrel in which the charge is to be fired, at a number of points therealong, and causing the developed gas to issue from the taps and against a moving record.

13. A method of determining the interior ballistic characteristics of fixed ammunition, characterized by the feature that the projectile-propelling gas is caused to record its action on a moving record.

14. A method of determining the interior ballistic characteristics of fixed ammunition, comprising, igniting the charge in a barrel and successively indicating the arrival of the charge at a number of points along the barrel at successive stages of its action.

15. A method of determining the recoil due to the firing of an ammunition charge, comprising, igniting the charge in a barrel, and automatically recording the barrel movement when the charge arrives at a predetermined point therealong.

16. A method of determining the recoil due to the firing of an ammunition charge, comprising, igniting the charge in a barrel, and automatically recording the barrel movements corresponding to the times when the charge arrives at predetermined points therealong.

17. A method of determining the recoil due to the firing of an ammunition charge, comprising, igniting the charge in a barrel, automatically recording the barrel positions when the charge is fired and when the charge arrives at a predetermined position therealong.

18. A method of determining the recoil due to the firing of an ammunition charge, comprising, igniting the charge in a barrel, and directly recording the barrel movement on a record adjacent to the barrel.

19. A method of determining the recoil due to the firing of an ammunition charge, comprising, tapping the barrel in which the charge is fixed, and recording the barrel movement on a record opposite the tap.

20. A method of determining the recoil due to the firing of an ammunition charge, comprising, tapping the barrel, in which the charge is fired, at a number of points spaced therealong, and recording the barrel movement on a record opposite the taps.

21. A method of determining the recoil due to the firing of an ammunition charge, comprising, tapping the barrel in which the charge is fired, and causing the developed gas to issue from the tap and against a record opposite the tap.

22. A method of determining the recoil due to the firing of an ammunition charge, comprising, tapping the barrel, in which the charge is fired, at a number of points therealong, and causing the developed gas to issue from the taps against a record opposite the taps.

23. An apparatus for testing fixed ammunition having a non-magnetic projectile, comprising, a barrel adapted to receive a cartridge, means for firing the cartridge so as to cause the charge to move along said barrel, record receiving means, and controlling means at spaced points along said barrel, adapted to cause the arrival of the charge at said points to be recorded on said record receiving means.

24. An apparatus for testing fixed ammunition, comprising, a barrel adapted to receive a cartridge, means for firing the cartridge in said barrel, record receiving means, and a fitting in said barrel adapted to direct the escape of gas therefrom and against said record receiving means.

25. An apparatus for testing fixed ammunition, comprising, a barrel adapted to receive a cartridge, means for firing the cartridge in said barrel, record receiving means, controlling means at spaced points along said barrel, adapted to cause the arrival of the charge at said points to be recorded on said record receiving means, and means for moving said record receiving means adjacent said controlling means and relatively thereto.

26. An apparatus for testing fixed ammunition, comprising, a barrel adapted to receive a cartridge, means for firing the cartridge in said barrel, said barrel having a series of outlets spaced therealong adapted to permit the escape of the projectile-propelling gas, and record receiving means movably mounted adjacent said outlets.

27. An apparatus for testing fixed ammunition, comprising, a barrel adapted to receive a cartridge, means for firing the cartridge in said barrel, said barrel having a series of outlets spaced therealong adapted to permit the escape of the projectile-propelling gas, record receiving means movably mounted adjacent said outlets, and means for measuring the movement of said record receiving means.

28. An apparatus for testing fixed ammunition, comprising, a barrel adapted to receive a cartridge, means for firing the cartridge in said barrel, said barrel having a series of outlets spaced therealong adapted to permit the escape of the projectile-propelling gas, record receiving means movably mounted adjacent said outlets, means for measuring the movement of said record receiving means, and means cooperating with said record receiving means for recording the time of firing of the cartridge.

29. An apparatus for testing fixed ammunition, comprising, a barrel adapted to receive a cartridge, means for firing the cartridge in said barrel, a fitting in said barrel having a plunger operable by the projectile-propelling gas, and record receiving means positioned to be engaged by said plunger.

30. In an apparatus for testing fixed ammunition, a moving record, means for recording the action of the ammunition thereon, a time record moving with said ammunition record, a chronometer, and means controlled by said chronometer adaped to make indications on said time record at measured time intervals.

31. In an apparatus for testing fixed ammunition, a moving record drum, a time-recording drum moving therewith, and time-controlled means for making indications on said time-recording drum.

32. In an apparatus for testing fixed ammunition, timing mechanism comprising, a rotating drum, a lead screw rotating therewith, a stylus carrier engageable with said lead screw and having a stylus engageable with said drum, and time-controlled means for effecting engagement of said stylus with said drum at regular intervals.

33. In an apparatus for testing fixed ammunition, timing mechanism comprising, a rotating drum, a lead screw rotating therewith, a stylus carrier engageable therewith and having a stylus engageable with said drum, means for effecting engagement of said carrier with said screw, and a stop adapted to prevent engagement of said stylus with said drum until said carriage is engaged with said screw.

34. An apparatus for testing fixed ammunition, comprising, a barrel adapted to receive a cartridge, means for firing the cartridge in said barrel, a drum mounted for rotation adjacent said barrel, means providing a port tapping said barrel adapted to cause the projectile-propelling gas to record its action on said drum, a fixed index adjacent said drum, and a graduated sector adapted for attachment to said drum to move therewith adjacent said index.

35. An apparatus for testing fixed ammunition, comprising a barrel adapted to receive a cartridge, means for firing the cartridge in said barrel, a drum mounted for rotation adjacent said barrel, means providing a port tapping said barrel adapted to cause the projectile-propelling gas to record its action on said drum, an index wire stretched axially along the periphery of said drum, and a graduated sector adapted for attachment to said drum to move therewith adjacent said index.

36. An apparatus for testing fixed ammunition, comprising, a barrel adapted to receive a cartridge, means for firing the cartridge in said barrel, a drum mounted for rotation adjacent said barrel, means providing a port tapping said barrel adapted to cause the projectile-propelling gas to record its action on said drum, a time record driven to move in timed relation with said drum, a chronometer, and means controlled by said chronometer adapted to make indications on said time record at measured time intervals.

37. An apparatus for testing fixed ammunition, comprising, a barrel adapted to receive a cartridge, means for firing the cartridge in said barrel, a drum mounted for rotation adjacent said barrel, means providing a port tapping said barrel adapted to cause the projectile-propelling gas to record its action on said drum, a time record driven to move in timed relation with said drum, time-controlled means for marking said record at measured time intervals, and means controlled by said discharging means adapted to start the operation of said marking means.

38. An apparatus for testing fixed ammunition, comprising, a barrel adapted to receive a cartridge and mounted for axial movement, means for firing the cartridge in said barrel, a record sheet movable adjacent said barrel, and means providing a port tapping said barrel adapted to cause the projectile-propelling gas to make a record on said sheet.

39. An apparatus for testing fixed ammunition, comprising, a barrel adapted to receive a cartridge and mounted for axial movement, means for firing the cartridge in said barrel, a record sheet movable adjacent said barrel and transversely thereof, and means providing a port tapping said barrel adapted to cause the projectile-propelling gas to make a record on said sheet.

40. An apparatus for testing fixed ammunition, comprising, a barrel adapted to receive a cartridge and mounted for axial movement, means for firing the cartridge in said barrel, a record sheet movable adjacent said barrel, means providing a port tapping said barrel adapted to cause the projectile-propelling gas to make a record on said sheet, and means for timing the movement of said sheet.

41. An apparatus for testing fixed ammunition, comprising, a barrel adapted to receive a cartridge and mounted for axial movement, means for firing the cartridge in said barrel, a record drum mounted for rotation adjacent to and transversely of said barrel, and means for recording the recoil movement of said barrel on said drum.

FRANKLIN W. OLIN.
JOHN M. OLIN.
ROBERT G. CLYNE.